United States Patent [19]

Tilton

[11] Patent Number: 4,477,399
[45] Date of Patent: Oct. 16, 1984

[54] METHOD AND APPARATUS FOR MANUFACTURING A FOAM INSULATED WATER HEATER

[75] Inventor: Robert W. Tilton, Oakville, Canada

[73] Assignee: GSW Inc., Toronto, Canada

[21] Appl. No.: 389,032

[22] Filed: Jun. 16, 1982

[51] Int. Cl.³ ............................ B29D 27/04; B28B 7/32
[52] U.S. Cl. ................................. 264/45.2; 122/13 R; 122/114; 122/119; 126/375; 126/376; 126/361; 249/65; 249/152; 249/179; 264/46.5; 264/46.9; 264/315; 264/DIG. 44; 425/123; 425/185; 425/186; 425/817 R; 425/DIG. 19; 425/DIG. 112
[58] Field of Search ............... 264/45.2, 315, 46.9, 264/DIG. 44; 425/23, 52, 53, 58, 186, 185, 193, 195, DIG. 19, DIG. 112, 123, 817 R; 249/65, 152, 179; 126/344, 375, 361, 376; 122/13 A, 114, 119

[56] References Cited

U.S. PATENT DOCUMENTS

| | | | |
|---|---|---|---|
| 1,286,107 | 11/1918 | Renner | 425/53 |
| 2,221,794 | 11/1940 | Gould et al. | 249/65 X |
| 2,349,961 | 5/1944 | Hansen | 249/65 X |
| 2,428,466 | 10/1947 | Palm | 126/344 X |
| 2,575,734 | 11/1951 | Schulman | 425/DIG. 19 |
| 2,643,323 | 6/1953 | Carlson et al. | 122/13 A X |
| 2,852,807 | 9/1958 | Altschuler | 249/65 X |
| 2,956,146 | 10/1960 | Weinman | 122/13 A X |
| 3,135,998 | 6/1964 | Fowler, Jr. et al. | 425/DIG. 19 |
| 3,253,731 | 5/1966 | Fink et al. | 220/9 |
| 3,313,020 | 4/1967 | Krauskopf | 264/45.2 X |
| 3,444,279 | 5/1969 | Dost | 264/46.9 X |
| 3,521,604 | 7/1970 | Nickel | 122/13 A |
| 3,542,327 | 11/1970 | Herzog | 249/65 |
| 3,932,088 | 1/1976 | Harada et al. | 249/65 X |
| 4,296,799 | 10/1981 | Steele | 264/45.2 X |
| 4,372,028 | 2/1983 | Clark et al. | 264/45.2 X |

FOREIGN PATENT DOCUMENTS 885831 11/1971 Canada.

Primary Examiner—Philip Anderson

[57] ABSTRACT

A method for insulating a water heater with foamed insulation comprises inflating a tube in the cavity between the shell and the tank to define a boundary for the cavity into which the insulating material is injected. The device is deflated after the foamed insulation has set in the cavity. Apparatus for carrying out such method is provided.

26 Claims, 6 Drawing Figures

METHOD AND APPARATUS FOR MANUFACTURING A FOAM INSULATED WATER HEATER

FIELD OF THE INVENTION

This invention relates to methods and apparatus for insulating water heaters with a post-foaming insulative composition.

BACKGROUND OF THE INVENTION

For many years, it has been common practice to insulate the cavity defined between the inner tank of a water heater and its outer shell with various types of fibreglass and other batting materials. Fiberglass is difficult to handle and may be hazardous to one's health; therefore, there is a movement towards the use of foamed insulative materials for insulating water heaters. Aside from health reasons, more importantly, foamed insulative materials have a better heat insulating value than fibreglass, so that either thinner layers of insulation may be used to provide the same degree of insulation as with fiberglass, or much thicker foamed insulative materials may be used to increase the insulation value for the water heater.

Various types of waer heaters, as insulated with foamed insulation, are disclosed, for example, in U.S. Pat. No. 3,253,731 and Canadian Pat. No. 885,831. Various techniques have been employed to contain the foam when injected into the cavity between the inner tank and the outer surronding shell. Particularly, with gas-fired water heaters, it is most important to isolate the foamed insulative material from the hot regions of the gas burner area. This is particularly important when using foamed polyurethanes, because the isocyanate component of the polyurethane, when burned, releases toxic gases.

In the art of insulating with foam materials, various techniques have been developed. For example, in U.S. Pat. No. 3,313,020, a railcar is insulated with a foam material. To define cavities in the area to be insulated, tubes of polyethylene are filled with a foam material. The formed cavities are subsequently insulated with additional foam material. The polyethylene tubes, as filled with foam, remain in the cavity.

Similar approaches have been used in insulating water heaters, such as the unit sold by Rheem International of Montgomery, Ala. A polyethylene bag is provided about the base of the inner tank of a water heater. The bag is expanded with foam insulation to seal off the lower portion of the cavity. Post-foaming insulative material is then introduced into the upper region of the cavity to complete insulation of the water heater tank. The bag with foam remains with the water heater. Sometimes the bag is over expanded with foam, causing it to burst. The unset foam can flow below the inner tank and may result in an ineffective seal for the cavity.

U.S. Pat. No. 4,296,799 discloses an approach for insulating a solar water tank where an inflatable bag is located within the tank and polyurethane foam is injected between the inflated bag and the outer shell of the tank. When the foam sets, the bag is supported for defining the interior holding portion of the tank.

Another approach in containing the insulative foam material about the inner tank of a water heater is provided by State Industries of Ashland, Tenn. A bulky preformed bag surrounds the entire tank into which foam insulative material is injected. The bag contains the foam in the cavity between the inner tank and the outer shell. Difficulties arise in placing the bag about the tank and bursting the bag if too much foam is injected.

The method and apparatus, according to this invention, overcomes the above problems in providing a simple technique for insulating water heaters. The method readily provides access for inspection of the set foam to ensure that foam has not leaked beneath the inner tank, which could be exposed to the high temperatures of a gas or oil burner or electrical heater components.

SUMMARY OF THE INVENTION

The method, as embodied by this invention, for insulating electric, oil and gas-fired water heaters with a fluid post-foaming insulative composition is designed to insulate a water heater having an internal tank and an outer shell spaced from the tank walls to define a cavity to be filled with foamed insulative material. The method comprises inflating an inflatable device in the cavity between the shell and tank to define a boundary for a selected region of the cavity which is to be filled with the post-foaming insulative material. After injection of the insulative material, the inflated device is deflated when the material has set in the cavity. The deflated device may be optionally removed after the foamed insulative material has set. To facilitate removal, the device may have a surface composition which readily releases from the set foam insulation.

The apparatus for use in insulating a fuel-fired water heater comprises means for locating the inner tank bottom inwardly of the outer shell base portion to provide space beneath the inner tank for a fuel burner arrangement. An inflatable tube is provided for insertion in the cavity defined between the inner tank base portion and the outer shell. The tube, when inflated, seals off the cavity at the lower end of the water heater, where the tube is adapted to be deflated after foamed insulative material has set in the cavity. The tube may be provided with a valve for holding pressurized fluid in the inflatable tube and for releasing the fluid when deflation of the tube is desired. The locating means may be adapted to concentrically locate the outer shell relative to the inner shell, particularly when the water heater is cylindrical.

BRIEF DESCRIPTION OF THE DRAWINGS

Preferred embodiments of the invention are shown in the drawings wherein.

DETAILED DESCRIPTION OF THE PREFERRED EMBODIMENTS

A water heater normally comprises an inner tank surrounded by an outer shell, a space being provided between the outer shell and the inner tank. The purpose of the outer shell is to contain and protect insulation which is stuffed around the tank to reduce the heat loss from the hot water within the heater tank. It is now desirable to insulate this cavity between the outer shell and the inner tank with a type of foam insulation. A variety of foamed insulation, which is particularly suitable, is that commonly referred to as polyurethane foam. It is prepared by combining two basic components; namely, the well known isocyanate and polyol components. The gas forming component is usually a liquid in the polyol component and may be Freon 11 (trademark). The liquid components are mixed just before injecting into the cavity to be insulated with the foam. When the components are mixed, there is a heat of reaction which causes a vaporization of Freon 11 to commence foaming of the material. As is appreciated by those skilled in the art of working with polyurethane foams, a predetermined amount of components is injected into the cavity, such that when the foaming is complete the entire cavity is filled without considerably overpressurizing the area. In view of the nature of the chemicals, the foaming is carried out in a well ventilated area to reduce hazardous risks in working with the isocyanate component of the foaming material. It is also understood that the older technique of frothing using the polyurethane components may be employed to inject the post-foaming materials into the cavity.

Figure 1:
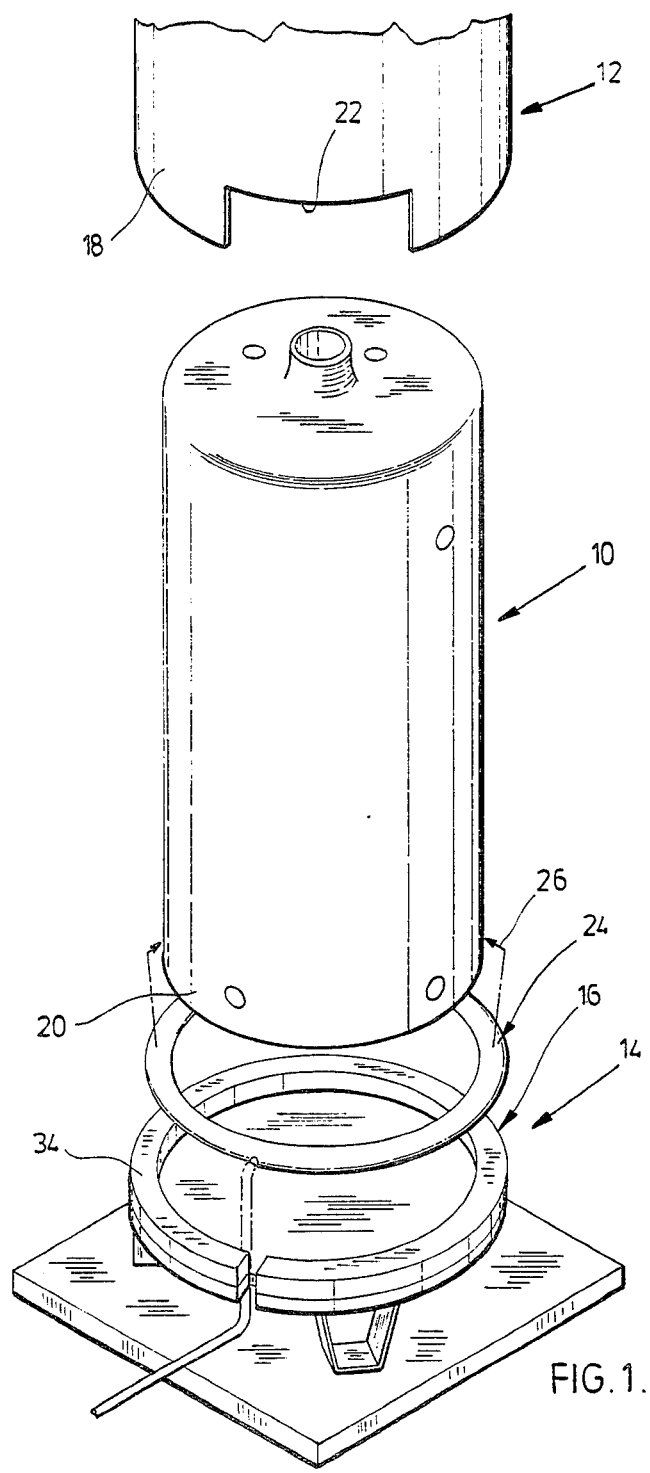
FIG. 1 is an exploded view of a water heater with apparatus in position for sealing off the cavity between the inner tank and the outer shell.

Referring to FIG. 1, the components to be assembled and insulated are shown where a water heater assembly includes an inner tank 10 and an outer shell 12. The apparatus generally designated 14, according to the invention, comprises a locating device 16 for locating the inner tank 10 inwardly of the bottom portion 18 of the outer shell 12. This provides a space beneath the bottom portion 20 of the inner tank 10 for a fuel burner arrangement. The burner may be of the common oil or gas-fired type. Access to that inner space is provided by the cutout portion 22 in the base 18 of the outer shell 12. An inflatable device 24 is provided for location about the base 20 of the inner tank as indicated by arrows 26. With the outer shell 12 lowered over the inner tank 10 and past the locating means 16, the inflatable device 24 is inflated to seal off the bottom part of the cavity in preparing for insulating the cavity between the tank and outer shell 12. Either a liquid or a gas may be used to inflate device 24. Gas, such as pressurized air, is the most convenient; however, liquids such as pressurized water may be used. To expedite cycle times with the use of liquids, when the device is to be deflated, the liquid can be withdrawn under vacuum from the device.

Figure 2:
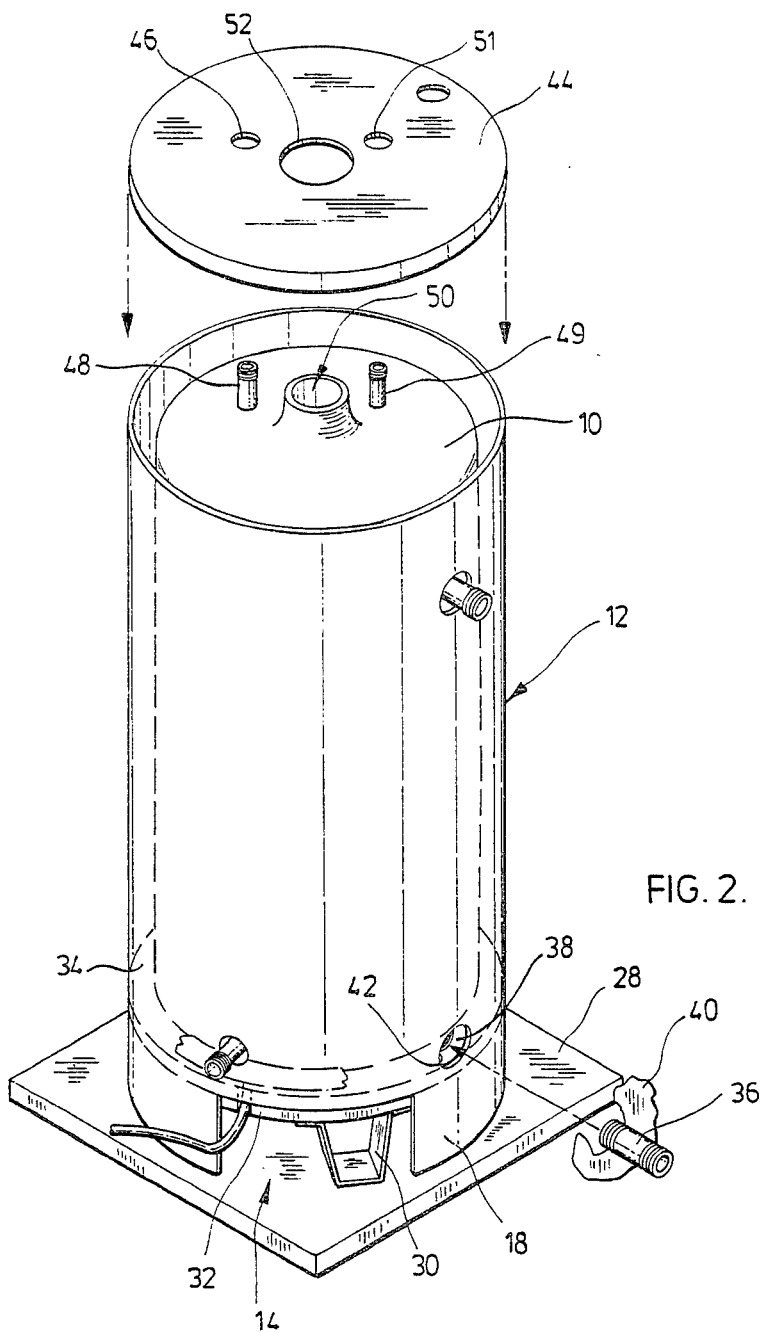
FIG. 2 shows the apparatus of FIG. 1 assembled preparatory to injection of insulation material.

Turning to FIG. 2, the assembly of the components of FIG. 1 is shown. The outer shell 12 is placed over the inner tank 10 with the bottom portion 18 resting on the support 28 of the locating device 14. The locating device 14 includes feet 30, which elevate the circular platform 32 above the support plate 28. The inner tank 10 rests on the platform 32 where the base portion 20 fits within an annular ring portion 34, as shown more clearly in FIG. 1, on the platform 32. The circular platform 32, as is more clearly shown in FIG. 4, contacts the interior of the outer shell to concentrically locate the outer shell relative to the inner tank 10 which is located by the ring 34.

The various components of the inner tank, which project through the outer shell, are placed in position such as the nipples 36 which have threaded ends for screwing into the threaded bores 38 in the inner tank. Each nipple portion, as it extends through the outer shell 12, has some form of sealing material 40 wrapped around the nipple to seal off the opening 42 formed in the outer shell. This takes place at the many locations as shown in the hot water tank shell. Similarly, with the top 44 of the tank, it has apertures 46 and 51 to receive nipples 48 and 49, which again are sealed with appropriate material. This material may be a wad of fibreglass or other packing material. The central flue 50 of the inner tank extends upwardly through aperture 52 in the top 44. Again heat resistant insulative or packing material is provided around the flue 50 to seal aperture 52 in the top.

Figure 3:
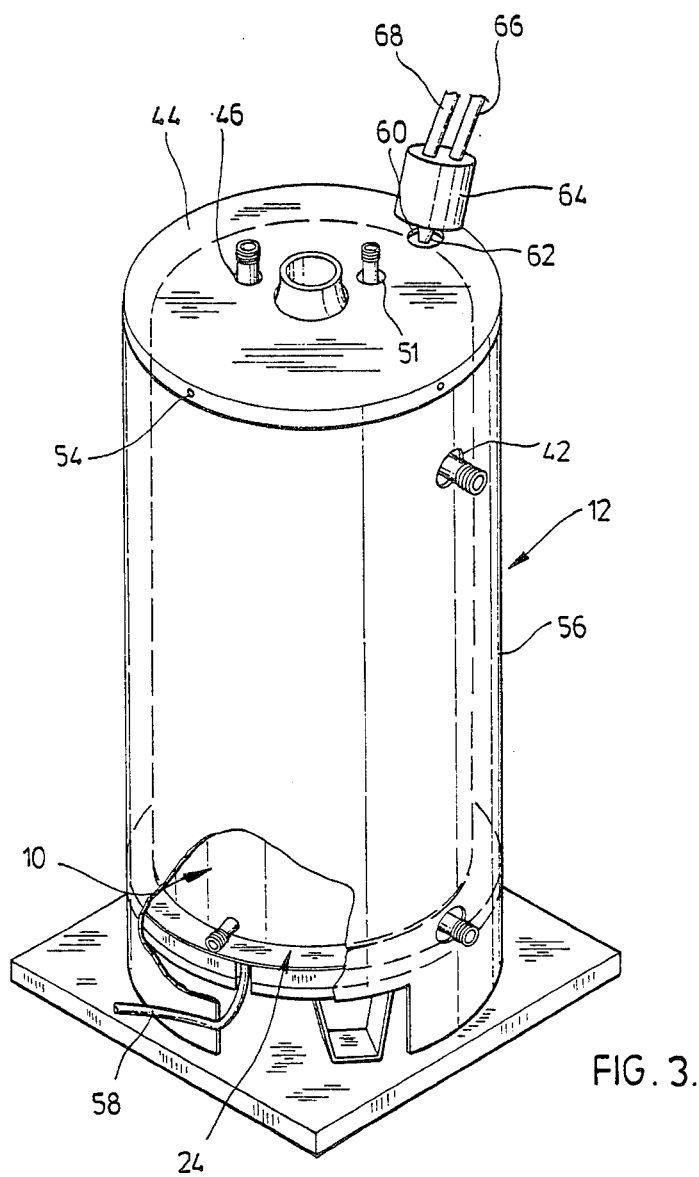
FIG. 3 is an assembled view of FIG. 2 showing the injection of the insulating material.

As shown in FIG. 3, the top 44 of the hot water tank is secured by threaded screws 54 to complete the assembly of the outer shell 12 on the inner tank 10, insulative material being provided about the apertures 42 and 46 of the side and top portions of the shell. A cavity 56 is provided between the shell 12 and the inner tank 10. The annular cavity extends up the sidewall portion of the tank 10 with an upper cavity portion beneath the top 44 of the outer shell. To seal off and define the lower boundary of the cavity, the inflatable device 24, which is in the form of a tube, is inflated by delivering compressed air in conduit 58 to the tube 24. Conduit 58 may be equipped with a valve, which allows the delivery of compressed air in the tube to inflate it between the outer shell 12 and the inner tank 10 about its base portion 20. The tube 24 is inflated sufficiently to ensure a complete seal about the bottom area of the cavity 56. With the top in place and all apertures about the remainder of the shell sealed, opening 60 is provided in the top 44 of the tank into which a mixing head 64 is inserted. The mixing head has a separate conduit 66 for the isocyanate component and 68 for the polyol component to be mixed in the mixing head 64 just prior to injection into the cavity 56 through nozzle 62.

Figure 4:
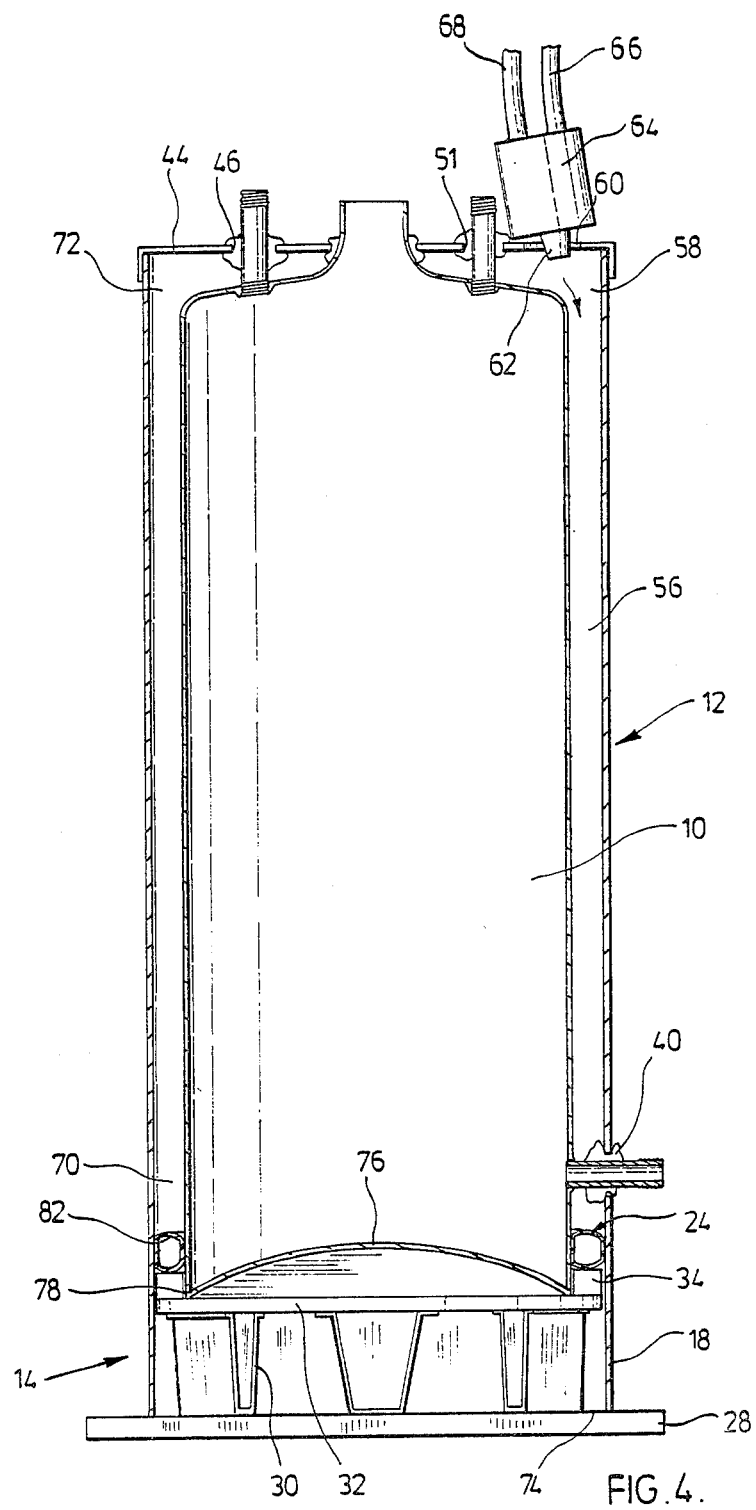
FIG. 4 is a section through FIG. 3.

As more clearly shown in the section of FIG. 4, the mixed liquid insulative material flows into the cavity 56 in the direction of arrow 58. Due to its liquid state, the liquid travels to the bottom region 70 of the cavity, where it can be seen that the tube 24 is inflated to seal off the bottom region of the cavity 56.

The wadding 40 is in place about the various apertures of the shell 12 to ensure that the insulative material, as it foams and begins filling up the cavity 56, does not escape. As is appreciated by those skilled in the art, as the polyurethane commences foaming, the foam moves upwardly from the base portion 70. For the proper shot size injected into the cavity 56, the foam will continue to rise and complete expansion as it reaches the upper region 72 to contact the top portion 44 of the tank. The foam has the characteristics such that it fills all voids in the cavity region to ensure a complete insulation of the cavity about the entire periphery of the hot water tank.

As is more clearly shown in FIG. 4, the bottom portion 18 of the outer shell 12 rests on the base support 28 of the locating device 14. The feet 30 support the platform 32 of the locating means. The desired height of the base 18 of the outer shell provides a space between the bottom 74 of the outer shell and the concave bottom portion 76 of the inner tank 10. This space accommodates the standard form of gas burner arrangement, access to which is provided by the opening 22 in the outer shell as shown in FIG. 1. The tube 24 is elevated above the bottom 78 of the inner tank by the annular ring 34. This determines the necessary distance between the lower portion 82 of the set foam and the space which accommodates the gas burner arrangement. The foam is not exposed to the higher temperatures which could cause deterioration of the isocyanate component of the polyurethane foam to release toxic gases.

It is appreciated that the tube 24 may have an internal dimension to permit a snug fitting of the deflated tube about the bottom portion of the tank 10. In some situations, this may be desirable in positioning the tube about the bottom of the tank and retaining it there prior to inflation. The tube may be formed of a rubber material which has its surface treated with a release agent, so as to release from the set foamed insulation. Such treatment may include the use of a wax silicone or a laminate layer of polyethylene on the surface of the tube which will readily release from the set foam. This allows deflation of the tube 24 and removal from the bottom portion of the inner tank 10 for subsequent reuse.

It is also appreciated that the inflatable device 24 may be made of polyethylene or other suitable inexpensive material and inflated to seal off the cavity. Upon setting of the foam, the inexpensive polyethylene tube is deflated and is left in the cavity. This may be desirable in situations where reuse of the tubes is inconvenient.

Figure 5:
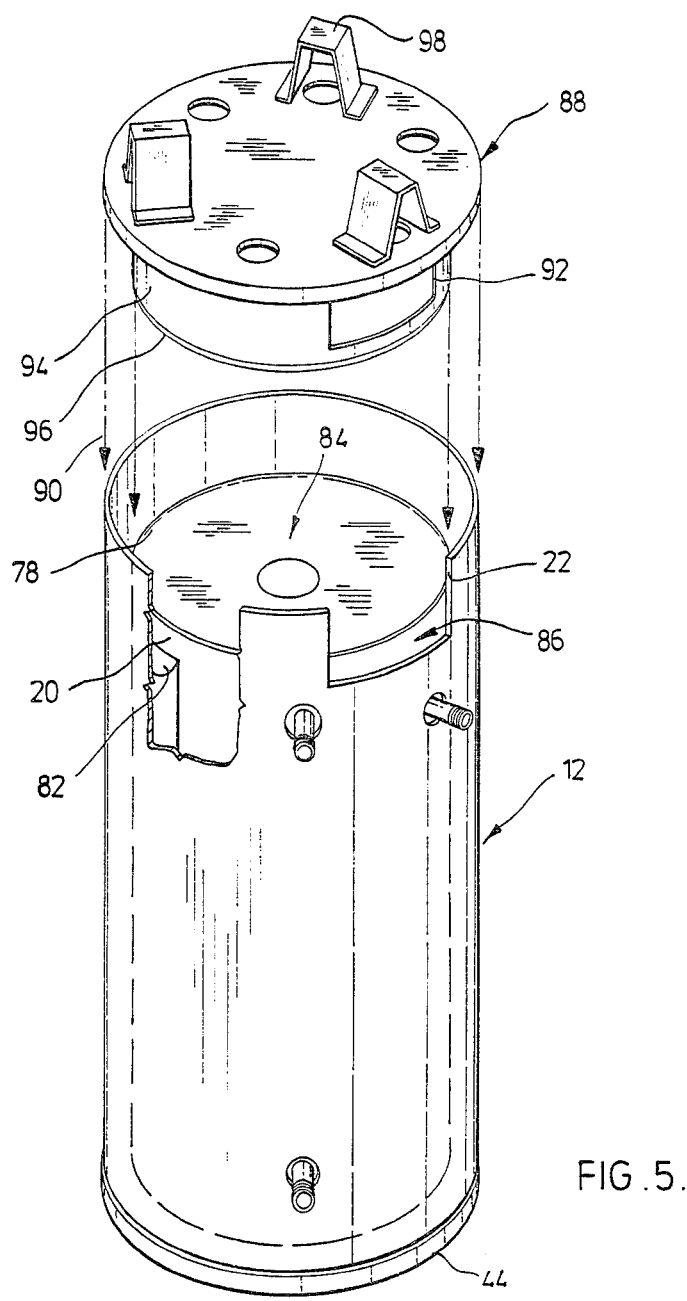
FIG. 5 shows the insulated tank of FIG. 4 inverted to facilitate inspection.

Referring to FIG. 5, the water heater is inverted for inspection with the top 44 resting on an appropriate support surface with the bottom of the outer shell 12. With release material on the inflatable tube, it is readily pulled from the bottom of the assembled insulated water heater. This permits inspection of the set insulation material 82 and the region generally designated 84 and 86 to ensure that there have been no leaks which would allow the foam to gather in the areas of the gas-fired heater arrangement. The region 86 may be stuffed with a band of fiberglass which has a much higher temperature resistance to complete insulation of the lower portion 20 of the inner tank 10. To complete assembly of the gas-fired water heater, the base plate arrangement 88 is pushed onto the outer shell in the direction of arrows 90. An opening 92 in its sleeve portion 94 is aligned with the opening 22 in the outer shell. The upper edge 96 of the sleeve is dimensioned to fit within the base portion 78 of the inner hot water tank to support it when the water heater is uprighted and the feet 98 of the base plate are resting on an appropriate support surface. The burner arrangement may, of course, be installed beneath the inner tank by access through the opening 22 in the outer shell and the opening 92 in the skirt 94 of the base plate 88.

Figure 6:
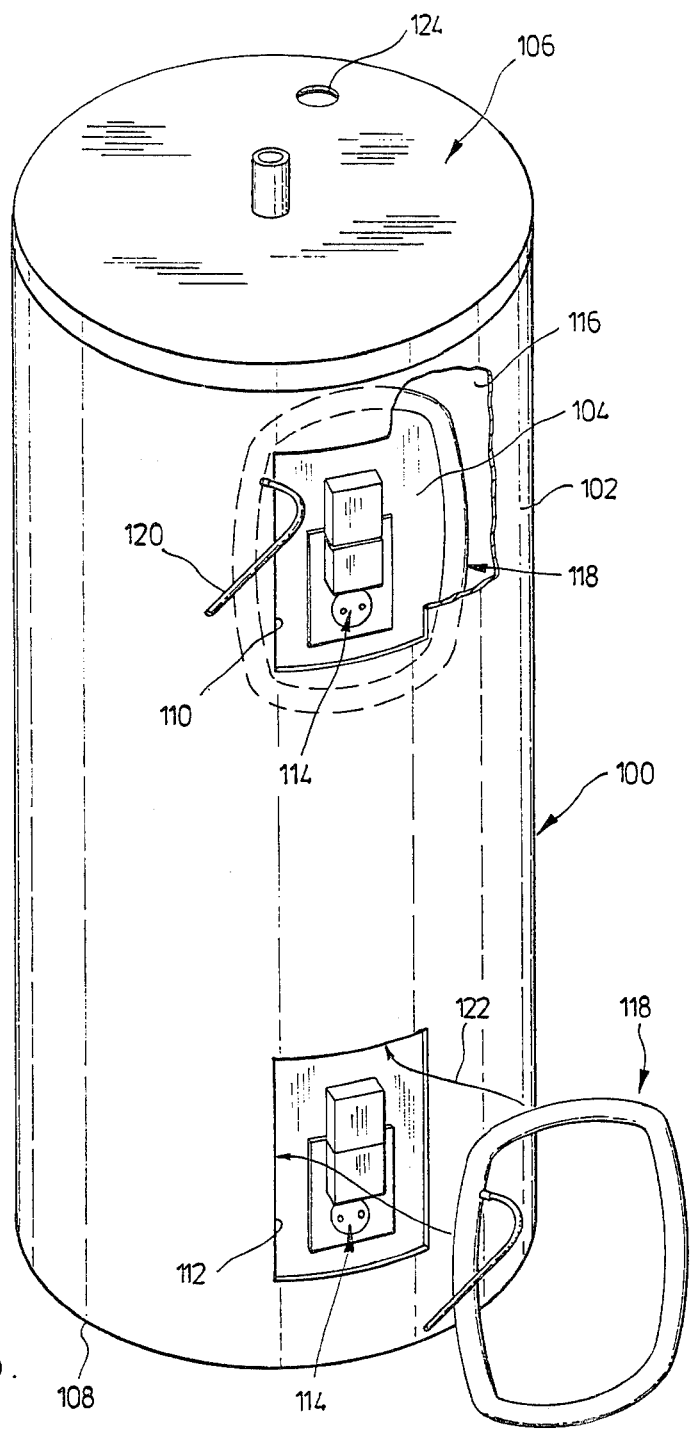
FIG. 6 shows the invention as embodied in insulating an electric water heater.

FIG. 6 demonstrates the invention as embodied in insulating an electric water heater 100. The water heater 100 comprises an outer shell 102 and an inner tank portion 104. The outer shell 102 has top portion 106 and a bottom portion 108 to totally enclose the inner tank 104. To provide access, service and insertion of the heater elements in the inner tank 104, openings 110 and 112 are cut in the outer shell 102. The heater elements generally designated 114 are inserted in the known way and sealed to the inner tank 104. To prevent the foamed insulated material coming into contact with the wiring and electrical devices associated with each heater 114, the cavity 116 between the outer shell 102 and the inner tank 104 must be sealed off in the region of each electrical heater element 114.

To accomplish this, according to this invention, an inflatable device 118 in the form of a tube is inserted between the outer shell 102 and the inner tank 104. It is inflated, as with the embodiment of FIG. 1, by delivering pressurized air in conduit 120 to the tube 118. A valve may be provided in the conduit 120 to hold the pressurized air in the inflated tube 118 as it seals off and isolates a region from the foam insulation to be placed in cavity 116. Thus the tube 118 defines a boundary of the cavity.

Similarly with opening 112, tube 118 is inserted as shown by arrows 122 to define a similar region which is isolated from the cavity 116 to prevent any foam coming in contact with the electrical components of the heater 114. As with the embodiment of FIG. 4, the top 106 has an opening provided therein at 24 through which a conduit is inserted for injecting the fluid foaming material into the cavity 116 to completely insulate all remaining parts of the cavity.

When the foam insulated material has set, the inflatable devices 118 are deflated and removed. After the electrical connections are made, fiberglass insulation may be used to complete insulation about the heater elements 114.

A variety of shapes for the inflatable device may be used depending upon the shape of the boundary of the cavity which is to be defined. Although a circular tube 24 in the shape of a doughnut or torus is used with the embodiment shown, it is appreciated that a long cylindrical tube may be used to define a boundary for the cavity. In addition, with electric water heaters of FIG. 6, an inflatable bag may be used where appropriate support is provided to prevent the inflated bag from popping out of the opening in the shell.

The method and apparatus, according to this invention, provides a reliable easy to use technique in insulating water heaters with foamed insulation. By way of deflating the device and removing it, ready inspection of the foaming job is provided to ensure that no foam has flowed into the gas-fired burner region. To assist in the post-foaming of the insulative material, the inner tank may be heated with hot air and the like prior to the mixed urethane composition being injected into the cavity.

Although various preferred embodiments have been described herein in detail, it will be understood by those skilled in the art that variation may be made thereto without departing from the spirit of the invention or the scope of the appended claims.

The embodiments of the invention in which an exclusive property or privilege is claimed are defined as follows:

1. A method of manufacturing a water heater having an internal tank, an intermediate layer of expanded foam and an outer shell spaced from said internal tank by said intermediate layer, comprising
    positioning the outer shell about said internal tank to at least partially form a cavity for said insulative material,
    closing said partially formed cavity adjacent one end thereof by inflating an inflatable device between said shell and tank to define a boundary for said insulative material,
    placing an expandable foam material into said cavity defined by said internal tank, said inflatable device and said outer shell,
    waiting for said form material to expand and form said intermediate layer,
    deflating said inflatable device and inspecting the area of said tank and outer shell adjacent the boundary previously formed by said inflatable device to assure said intermediate layer has been retained by said inflatable device during the expansion of said expandable foam material.

2. A method of manufacture as claimed in claim 1 including inflating said inflatable device with compressed air.

3. A method of manufacture as claimed in claim 1 including removing said inflatable device after expansion of said foam material.

4. A method as claimed in claim 1 wherein said internal tank has a top, bottom and sidewall portions and said outer shell for surrounding said internal tank has an open bottom with top and sidewall portions, the sidewall portions of said shell having a base portion for extending below the bottom of said internal tank, positioning the bottom of said internal tank above the base portion of said outer shell to provide a space beneath said inner tank for a fuel-burner arrangement, and inflating said device about the periphery of said internal tank bottom between said tank and said outer shell to define a lower boundary for said cavity.

5. A method as claimed in claim 4 including orienting said water heater with its bottom lowermost and injecting such expandable foam insulative material through the top of said outer shell.

6. A method as claimed in claim 1 for insulating an electric water heater having said interior tank with top, bottom and sidewall portions, said outer shell for surrounding said interior tank having top, bottom and sidewall portions and said outer shell sidewalls having an opening to accommodate an electric heater for said tank, inflating said inflatable device between said tank and said shell around the opening perimeter to define a boundary for said cavity.

7. A method of claim 1, 4 or 6, sealing portions of said outer shell through which components of said inner tank extend prior to injecting such expanding foam material.

8. A method of claim 1, 4 or 6, using a mixed urethane composition as said insulative material, injecting such mixed urethane composition as a liquid into said cavity.

9. A method of claim 1, 4 or 6, using a mixed urethane composition as the foam material, pre-heating said inner tank wall portions and injecting such mixed urethane composition as a liquid into said cavity.

10. A method of claim 1, 4 or 6, injecting a predetermined amount of expanding foam insulative material such that when foamed, the entire cavity between said inner tank and said outer shell is filled.

11. A method of claim 1, 4 or 6, adapted for insulating a cylindrical water heater, locating said outer shell concentric with said inner tank to define an annular cavity along the side of said water heater.

12. An apparatus for use in insulating water heaters of the type having an inner tank and an outer shell spaced from such inner tank by an intermediate layer of insulative material, said apparatus comprising means for locating supporting such inner tank, means for locating and supporting such outer shell in a manner to be spaced from such inner tank which in combination with said means for locating and supporting such inner tank positions such inner tank within such outer shell intermediate the length thereof, an inflatable tube for securement about such inner tank intermediate the length thereof and interior to such outer shell, said tube when inflated sealingly engaging such outer shell and inner tank and closing the space therebetween to allow forming of such insulative layer by inserting a fluid post-foaming material in the space between such outer shell and such inner tank above said inflated tube.

13. An apparatus as claimed in claim 12 wherein said means for locating and supporting such inner tank also locates said outer shell to define the space between such outer shell and such inner tank.

14. An apparatus as claimed in claim 13 wherein said means for locating and supporting such inner tank is a raised platform, said platform being of a shape to position such outer shell with said platform interior to such shell.

15. An apparatus as claimed in claim 14 wherein said platform presents an area for supporting said tube at a position intermediate the length of such inner tank located and positioned by said platform.

16. Apparatus for use in insulating a fuel-fired water heater having an inner tank and an outer shell spaced from such inner tank to provide a cavity into which a fluid post-foaming insulative material is introduced to insulate such inner tank, said apparatus comprising means for locating such inner tank bottom inwardly of such outer shell base portion to provide space beneath such inner tank for a fuel burner arrangement and an inflatable tube for insertion in the cavity defined between such inner tank base portion and such outer shell, said tube when inflated with fluid sealing off such cavity at the lower end of said water heater and said tube being deflatable after foamed insulative material has set in such cavity.

17. Apparatus of claim 16, wherein said tube has a valve for holding pressurized fluid in the inflated tube and for releasing such pressurized fluid when deflation of said tube is desired.

18. Apparatus of claim 16, wherein said locating means is adapted to concentrically locate such outer shell relative to such inner tank.

19. Apparatus of claim 18, wherein said locating means is adapted to support such inner tank.

20. Apparatus of claim 16, wherein said apparatus is used for insulating a water heater having a cylindrical inner tank and corresponding cylindrical outer shell, said locating means having a support on which such inner tank rests and a circular portion for contacting the interior of said outer shell thereby locating such outer shell concentric with such inner tank.

21. Apparatus of claim 20, wherein said support is adapted to elevate such inner tank upwardly relative to such outer shell to provide a space beneath the inner tank for a fluid burner arrangement.

22. Apparatus of claim 16, wherein said tube has its surface adapted to release from set foamed insulative material.

23. Apparatus of claim 22, wherein said tube has its surface treated with a release agent.

24. Apparatus of claim 16, wherein said tube consists of polyethylene.

25. Apparatus of claim 21, wherein said support is a plate having feet depending therefrom, said feet being of a height to locate such inner tank upwardly of such outer shell base portion.

26. Apparatus of claim 16, wherein said tube has a cylindrical or torus shape.

* * * * *